(12) United States Patent
Komissarov et al.

(10) Patent No.: US 11,080,920 B2
(45) Date of Patent: Aug. 3, 2021

(54) METHOD OF DISPLAYING AN OBJECT

(71) Applicant: DEVAR ENTERTAINMENT LIMITED, Nicosia (CY)

(72) Inventors: Andrei Valerievich Komissarov, p. Novaya Myza (RU); Anna Igorevna Belova, Tula (RU)

(73) Assignee: DEVAR ENTERTAINMENT LIMITED, Nicosia (CY)

(*) Notice: Subject to any disclaimer, the term of this patent is extended or adjusted under 35 U.S.C. 154(b) by 0 days.

(21) Appl. No.: 16/852,876

(22) Filed: Apr. 20, 2020

(65) Prior Publication Data

US 2020/0250878 A1 Aug. 6, 2020

Related U.S. Application Data

(63) Continuation-in-part of application No. 15/544,943, filed as application No. PCT/RU2016/000104 on Feb. 25, 2016, now abandoned.

(30) Foreign Application Priority Data

Mar. 25, 2015 (RU) .......................... RU2015111132

(51) Int. Cl.
*G06T 15/04* (2011.01)
*G06T 7/73* (2017.01)
(Continued)

(52) U.S. Cl.
CPC ................ *G06T 15/04* (2013.01); *G06T 7/73* (2017.01); *G06T 17/30* (2013.01); *G06T 19/006* (2013.01);
(Continued)

(58) Field of Classification Search
CPC ........... G06T 7/00; G06T 15/04; G06T 19/20; G06T 15/20; G06T 7/40; G06T 2219/2012; G06T 19/006; G06T 19/00; G06T 2207/10016; G06T 7/73; G06T 17/30; G06T 2200/08; G06T 2219/2004; G06K 9/00201; G06K 9/00208
See application file for complete search history.

(56) References Cited

U.S. PATENT DOCUMENTS

2015/0254903 A1* 9/2015 Sumner ................... G06T 15/04
345/420
2015/0363971 A1* 12/2015 Pan ......................... G06T 7/593
345/420

* cited by examiner

*Primary Examiner* — Jennifer Mehmood
*Assistant Examiner* — Andrew Shin
(74) *Attorney, Agent, or Firm* — Nadya Reingard; Yan Hankin

(57) ABSTRACT

The technical result obtained herein is providing the ability to display an output image having the actual texture of the photo or video image, simplifying the implementation by eliminating the need to store a database of reference textures of objects, enabling texturizing of a 3D model areas invisible on the 2D object. A feature-based ORB-SLAM algorithm can be used for image processing using sparse point cloud. An advantageous solution is provided that allows to improve the efficiency of the texturizing process and therefore allows to use the ORB-SLAM algorithm on mobile devices by reducing computational intensity of the overall process. In order to achieve these advantages, a system of preliminary image processing is implemented. Said preliminary image processing allows to identify the most promising areas for detecting object features on the images coming from the camera.

16 Claims, 3 Drawing Sheets

(51) Int. Cl.
*G06T 17/30* (2006.01)
*G06T 19/20* (2011.01)
*G06T 19/00* (2011.01)

(52) U.S. Cl.
CPC .......... *G06T 19/20* (2013.01); *G06T 2200/08* (2013.01); *G06T 2219/2004* (2013.01)

METHOD OF DISPLAYING AN OBJECT

CROSS-REFERENCE TO RELATED APPLICATIONS

The present patent application is Continuation-in-Part of the U.S. patent application Ser. No. 15/544,943, filed on Jul. 20, 2017, which is a National Stage application from International Application PCT/RU2016/000104, filed on 25 Feb. 2016, which claims priority from Russian Patent Application RU2015111132, filed on 25 Mar. 2015; said applications and their disclosures being incorporated herein by reference in their entireties.

FIELD OF INVENTION

The invention relates to the processing and generation of image data, the analysis of an image and its texture, rendering of a 3D (three-dimensional) image, including its texture displaying.

BACKGROUND

The closest as to the technical essence is the way to generate a texture in real time scale, including the following steps: obtaining the position of the observer; calculating the field of view; determining the required resolution for visualization; obtaining a map of the location of the thematic objects; obtaining the parameters of a thematic object; formation of a thematic object mask; receipt of photographic data from a thematic object; preparation of a thematic texture of the thematic object; texturizing of a thematic object by mask; placing a textured thematic object on a texture map; obtaining a map of the location of images of 3D objects; obtaining 3D object parameters; determining the type of objects; forming a 3D object model; obtaining a texture of 3D object; texturizing a 3D object; rendering a 3D object; forming a mask of images of a 3D object; formation of a dot-element image or mnemonic image of a 3D object; formation of a dot-element image or mnemonic image mask of a 3D object; placing a 3D object image on a texture map, and visualization (see RU 2295772 C1, cl. G06T 11/60).

The known method can be implemented for visualization of topographic images of the terrain and uses data of the parameters of thematic objects to compose the texture of their images.

The disadvantage of the known method is a limited set of conditional textures defined in advance for each particular object. The known method does not provide transmission of the actual picture of the surface of the object of the output image.

SUMMARY

The technical result obtained herein is providing the ability to display an output image having the actual texture of the photo or video image, simplifying the implementation by eliminating the need to store a database of reference textures of objects, enabling texturizing of a 3D model areas invisible on the 2D object. A feature-based ORB-SLAM algorithm can be used for image processing using sparse point cloud. An advantageous solution is provided that allows to improve the efficiency of the texturizing process and therefore allows to use the ORB-SLAM algorithm on mobile devices by reducing computational intensity of the overall process. In order to achieve these advantages, a system of preliminary image processing is implemented. Said preliminary image processing allows to identify the most promising areas for detecting object features on the images coming from the camera.

The indicated result is achieved by the method of displaying an object according to option 1, comprising:
 forming a 3D model,
 obtaining a photo or video image of the object,
 visualizing the 3D model,
 storing the 3D model in memory of a displaying device along with a reference image and coordinates of texturized sections corresponding to the polygons of the 3D model;
 receiving at least one image or image video frame of the object based on the reference image,
 recognizing the object on the frame based upon the reference image, if there are more than one frame, the selection is made based upon image quality, forming a conversion (transformation) matrix adapted to convert the coordinates of the photo image into its own coordinates,
 painting elements of the 3D model into colors of the corresponding photo elements by forming a texture of an area of the image that is being scanned,
 further using a coordinate transformation matrix and interpolating the data followed by setting the texture of the 3D model such that the corresponding polygons are covered by the corresponding texture regions according to coordinates determined at the texturizing stage,
 at least some parts of the 3D model that are not present on the photo image of the object are textured in accordance with a predetermined order, wherein the object is two-dimensional or perceived as a two-dimensional image, and the 3D model is formed with respect to at least a part of this two-dimensional image,
 the 3D model is visualized over a video stream using augmented reality tools and/or computer vision algorithms.
 In addition:
 forming the 3D model represented by polygons;
 forming coordinates transformation matrix to transform photo image coordinates into its own, namely Cartesian coordinates, characterized by the orthogonality of the axes;
 wherein sections of the 3D model that are absent on the image of the object are parts of the reverse side of the image details;
 wherein texturizing the 3D model in accordance with a predetermined order comprises generation of texture coordinates such that areas of the reverse side of the model have the same coordinates on the texture as the corresponding sections of the front side;
 wherein sections of the three-dimensional model that are absent on the image of the object are textured on the basis of extrapolation of the data of the visible parts of the image;
 wherein the 3D model is animated;
 wherein the object perceived as a two-dimensional image is a graphic image executed on a bent plane.

The technical result is providing an ability to display the actual texture of the photo or video image of the object on the output image, providing the training ability in drawing programs for children, simplifying implementation by eliminating the need to store reference textures database of objects, enabling texturizing of 3D models invisible on the 2D object, and also simplifying the use of texturizing process by providing an possibility for an untrained user to apply the usual techniques for painting 3D models.

Said result is achieved by displaying the object in accordance with an option 2, comprising
  i. forming a 3D model,
  ii. obtaining a photo or video image of the object,
  iii. saving in a memory of the displaying device the 3D model along with the reference image and the coordinates of the sections of texturizing corresponding to the ranges of the 3D model,
  iv. obtaining at least one image or video image frame of the object, the object is recognized on the frame based upon reference image, in case there is more than one frame, a selection is made based upon image quality,
  v. forming coordinates transformation matrix adapted to be used for conversion of photo image coordinates into own coordinates of the image,
  vi. painting elements of the 3D model into the colors of the corresponding photo elements by determining the colors of the 3D model materials based on the color scanning at predetermined photographic image points using the coordinate transformation matrix, and then assigning colors to the corresponding 3D model materials, at least some of the 3D model portions missing from the photo image of the object are textured in accordance with a predetermined order.
  vii. The object is two-dimensional or perceived as a two-dimensional image, and the 3D model is formed with respect to at least a portion of this two-dimensional image, the 3D model is rendered over the sequence of video frames using augmented reality tools and/or computer vision algorithms.

In addition:

forming a 3D model represented by polygons;

forming transformation matrix for transforming coordinates of the photo-image into its own, namely the Cartesian coordinates, characterized by the orthogonality of the axes;

wherein sections of the 3D model that are absent on the image of the object are parts of the reverse side of the image details;

wherein texturizing the 3D model in accordance with a predetermined order means generation of texture coordinates in such a way that the areas of the reverse side of the model have the same coordinates on the texture as the corresponding sections of the front side;

wherein sections of the three-dimensional model that are absent on the image of the object being texturized on the basis of extrapolation of the data of the visible parts of the image;

wherein 3D model is animated;

wherein the object perceived as a two-dimensional image is a graphic image executed on a bent plane.

Figure 1:
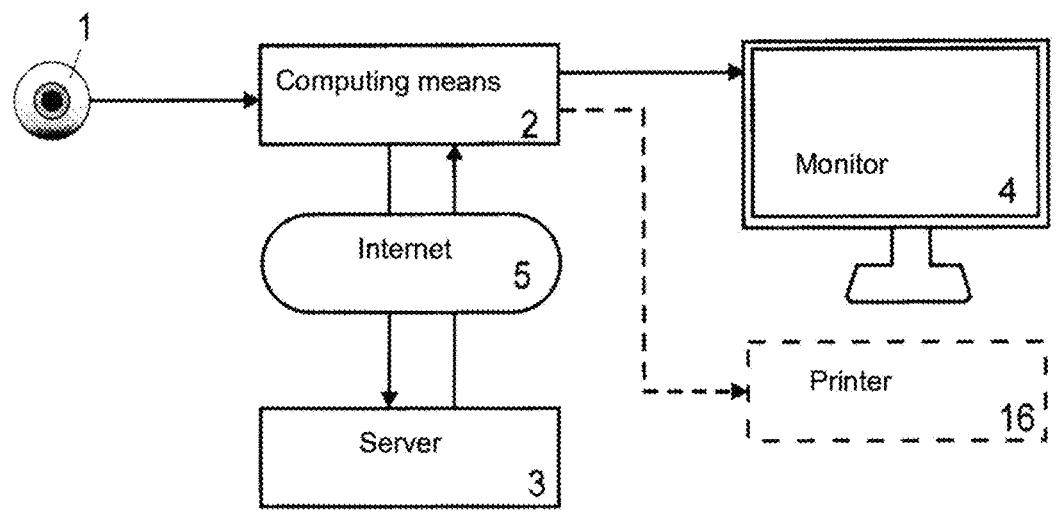
FIG. 1—depicts a block diagram of a PC-based display device and a remote server for storing a reference image and a 3D model described in Example 2.

The following references are used in the drawings: 1—video camera or camera, 2—computer aids, 3—server, 4—monitor, 5—Internet, 6—input of initial data: 3D model, texture coordinates, reference image, video stream, 7—video stream analysis, 8—verification of the condition that the video stream contains the reference image, 9—frame analysis, 10—verification of the framing condition, 11—generation of the photo image taking into account the coordinate transformation matrix, 12—texture scanning in the assigned sections—texturizing sections, 13—access to the video camera, checking the condition of recognition of the object on the video image, 14—output to the monitor, visualization of the 3D model over the video, 15—the end of the program, 16—the printer, 17—the original object—a two-dimensional graphic image, 18—the user-drawn two-dimensional graphic image, 19—the display device (smartphone), 20—visualized on the monitor display device 3D model, 21—visualized 3D model background components.

DETAILED DESCRIPTION OF THE PREFERRED EMBODIMENT

The method of displaying the object, comprising a two-dimensional image in accordance to option 1, comprises sequentially performing the following actions:

forming and storing in the memory of the display device a reference image of the object with texturized areas and represented by 3D model polygons, wherein said polygon's coordinates correspond to the coordinates of the texturized areas, receiving at least one image frame or video image of an object, recognizing an object on the photo image based upon a reference image, selecting a frame satisfying image quality requirements such as clarity, detail, signal-to-noise ratio, etc., forming a coordinate transformation matrix for converting the coordinates of the photo image into its own coordinates, whose systems are oriented orthogonally to the axes, painting the 3D model elements in the colors of the corresponding photo elements by forming the image texture of the image scanning area using the coordinate transformation matrix and data interpolation, followed by replacing the 3D model structure with the acquired image of the scanning area, such that the corresponding polygons are covered by the respective texture regions in accordance with the coordinates pre-formed at the texturizing stage.

Then render a 3D model visualization. At the same time, at least some portions of the 3D model, for example, portions of the back side of the pattern, are painted in accordance with a predetermined order, and forming the 3D model with respect to at least a portion of this two-dimensional image, for example, with respect to the most significant of the aggregated plurality of images.

After recognition, the selection of the most informative from the viewpoint of scanning the data among the captured frames is performed. Such frames can be frames with the most clear image, with the greatest detail, etc. Visualization of 3D model is carried out over the video (video stream) using the augmented reality and/or computer vision algorithms.

Painting the 3D model in accordance with a predetermined order comprises generation of texture coordinates in such a way that the areas of the back side of the model have the same coordinates on the texture as the corresponding sections of the front side, or the coloring of the sections of the back side of the model are performed on the basis of extrapolation of the data of the visible parts of the image.

The 3D model is animated.

The method of displaying the object in accordance with option 1 works as follows.

The objects for displaying are graphic two-dimensional objects—drawings, graphs, schemes, maps, etc. The method assumes the process of recognizing on a photo image of a graphic object by computing means of a display device equipped with a video or camera or other scanning device and a monitor. Such devices can be a mobile phone, a smartphone, a tablet, a personal computer, etc.

A circle of two-dimensional objects, i.e. markers, created beforehand and juxtaposed with a plot-related 3D models represented by polygons, as well as reference images. Every two-dimensional image is associated with one reference image and one 3D model, stored in the memory of the display device. Reference images are used for recognition of an object and the formation of the coordinates transformation matrix. After being painted 3D models are visualized over a certain background, which can be a video stream formed at the output of a video camera or a photo image, received after photographing the object, or other background.

The formation of a 3D model involves the process of generating texture coordinates.

In accordance with the present invention, the process of generation of the texture coordinates, especially in the case when the received 2D image is distorted, for example the sheet of paper that is being scanned is bended or curved, can include processing received image with a SLAM (Simultaneous localization and mapping) algorithm. SLAM algorithms are known in the art and widely used in navigation, robotic mapping and odometry for virtual reality or augmented reality. An ORB-SLAM algorithm is also known in the art as a versatile and accurate SLAM solution for monocular, stereo and RGB-D cameras. It is being used in the art to compute in real-time the camera trajectory and a sparse 3D reconstruction of the scene in a wide variety of environments, ranging from small hand-held sequences of a desk to a car driven around several city blocks.

According to the present invention, the feature-based ORB-SLAM algorithm can be used for image processing using sparse point cloud. A feature is a certain combination of pixels in a 2D image that is characterized by a set of parameters that allow to define it in different lighting conditions, scale and angle of view. Using ORB-SLAM algorithm, object features are extracted from the sequence of images coming from the camera. Further, using a bundle adjustment algorithm, object features received from one or more frames are arranged in a 3D space, while simultaneously setting the location of the camera.

While the use of ORB-SLAM algorithms is known in the art, typically a single feature detector used is ORB (Oriented FAST and Rotated BRIEF). The algorithm ultimately belongs to the class of so-called feature-based. ORB-SLAM builds a sparse point cloud. Features may be represented by a combination of pixels that may comprise various types of corner, edge, and maxima shapes.

However, the known implementations of the ORB-SLAM algorithms are very computationally intensive and despite all the advantages of this algorithm, its use on mobile devices is not possible in most cases, since even on high-performance devices the resources are often insufficient to ensure adequate speed of the ORB-SLAM algorithm.

The present invention addresses this technical problem and proposes an advantageous solution that allows to improve the efficiency of the texturizing process and therefore allows to use the ORB-SLAM algorithm on mobile devices by reducing computational intensity of the overall process. In order to achieve these advantages, a system of preliminary image processing is implemented. Said preliminary image processing allows to identify the most promising areas for detecting object features on the images coming from the camera. In order to implement this solution, FAST (Features from Accelerated Segment Test) descriptor search algorithms can be used. As a result of an image being processed by FAST algorithm, a set of so-called FAST points, is generated.

According to the present invention, a subset of the FAST points identified by FAST algorithm can be selected as interest points. Interest points can be identified with a comparison framework and taxonomy for affine covariant interest point detectors. The covariant refers to the elliptical shape of the interest region, which is an affine deformable representation. Scale invariant detectors are represented well in a circular region. Maxima region and blob detectors can take irregular shapes. According to the present invention, interest points selected from identified FAST points based upon described criteria, where the number of interest points is not greater than certain threshold. Said threshold can be set as an algorithm parameter. Based upon said interest points a specific, a certain predetermined number of features can be detected, and said detection is done by using the advantageous approach of the present invention, only within the most promising areas as described in more details below (using DHOFR and DHOOFR algorithms).

Once said features are detected, they are being cut out, while remembering the position of this area in the original image and then the data indicating the detected areas is being transferred to the ORB-SLAM algorithm for processing.

Once the ORB-SLAM algorithm finds the position of the camera in 3D space and detects features relative to this camera location, the original image can be fixed relative to the fragments taken earlier from said image relative to the position of the camera in 3D space.

When features are determined, a key points within the features can be selected and used in the process of texturizing. The features and their key points are used for improving positioning of the camera with an offset relative to the coordinates of the vertices of the texture coordinate mapping. That is, if a texture coordinate (UV) mapping is a grid, it would be a flat projection of a 3D object onto the texture. If the key points of the image and the vertices of the texture coordinate mapping do not coincide, but it the location of the features within the reference image is known, the coordinates are adjusted accordingly to the relative displacement of the features to the vertices of the texture coordinate mapping. When adjusting the image, the position of the features transformed relative to the position of the UV vertices according to a pre-prepared template. Using the features allows to apply texture even if the received image is distorted, such as if an image is obtained by taking a picture of a curved or concave sheet. If it is required to make necessary changes to the geometry of the object during the construction of the 3D model, especially when the coordinates of the vertices changes and it needs to be accounted for the UV texture that will also change.

A novel and advantageous algorithm Dynamic HOFR-SLAM, or DHOFR-SLAM, developed based upon known FAST detector and a DHOFR descriptor algorithms. As one of the aspects of the present invention the known HOOFR algorithm has been greatly improved by providing a DHOOFR algorithm as follows:

Algorithm DHOOFR or Dynamic Hessian ORB—Overlapped FREAK (Fast Retina Keypoint) designed to use FAST points on an image pyramid, as will be appreciated by a skilled person. The DHOOFR algorithm is a descriptor algorithm of the FREAK class of algorithms. Algorithms of this class use a distribution similar to that of the human retina, wherein the size of the viewed window increases with distance from the center. The density of points decreases exponentially with distance from the center.

Figures 4A, 4B:
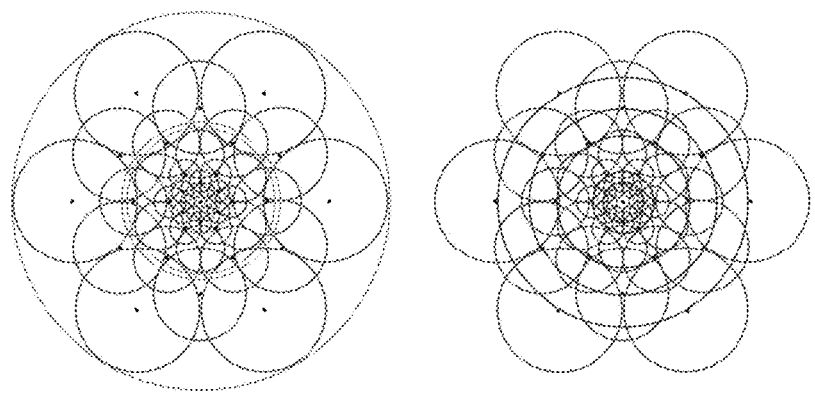
FIG. 4A and FIG. 4B—depict the difference between sampling pattern of the known FREAK algorithm (FIG. 4A) and sampling pattern of the DHOOFR algorithm (FIG. 4B).

While FREAK class descriptor algorithms work great with pyramidal detectors (like ORB) and space-scale SURF (Speeded-Up Robust Features) detectors, the advantageous solution of the present invention, DHOOFR algorithm, provides a modification to adapt the HOOFR descriptor to apply the FAST points approach to the original acquired image in a more robust way. According to the advantageous approach, once FAST points have been identified on the image, their subset forms a set of interest points are selected, as described above. The next iteration of processing to find the next set of FAST points is done only in the most promising area that is defined around each interest point with a certain radius using descriptor scaling factor. The FIG. 4A and FIG. 4B shows the difference between sampling pattern of the known FREAK algorithm (FIG. 4A) and sampling pattern of the DHOOFR algorithm (FIG. 4B).

With each iteration (to a certain threshold of iterations) the radius around the interest points is reduced by a scaling factor. During experiments performed with the descriptor, it was determined that the optimal scaling factor coefficient is √2. When scaling factor coefficient of √2 is used and FAST points are found with a threshold of 35 iterations in the original image, greater repeatability of the result is achieved, i.e. the ratio of stable points to newly found is approximately 70%. Since some points of the image are removed by the proposed coefficient, the descriptor created on the same image scale will be successfully matched with the descriptor of the image with reduced resolution (or density).

Another advantageous improvement to the known algorithms is using the Shi-Tomasi score instead of the Hessian score when selecting interest points. Due to the modification of the descriptor for working with FAST key points, the point estimation method used in the original HOOFR is no longer suitable. Calculation of responsiveness of a point using Hessian matrix allows the detector to select only those points that point to the blob regions of the image. This estimate is not suitable for the mentioned modification, since FAST points have better repeatability at corners in the image. The method of Shi-Tomasi allows to improve the selection of such points. The algorithm is based on the principles of calculating Harris angles, but differs in calculating the response measure: the algorithm directly calculates the value R=min ($\lambda_1$, $\lambda_2$), since it is assumed that the search for angles will be more stable.

Another advantageous improvement to the known algorithms is using 47 oriented descriptor pairs. The known HOOFR algorithms typically use 40 oriented pairs, using 47 oriented descriptor pairs allows to cover all the critical orientation angles of the descriptor created on the FAST points. Thus, an improvement in the accuracy of match descriptors is achieved, while the speed is reduced only slightly. According to the known algorithms, the regular FAST point with one pyramid matches within 8 degrees of a point's rotation, whereas using 47 pairs to orient the descriptor allows to cover an angle of 7.6 degrees, preventing the descriptor from falling into the "dead zone" where it cannot be recognized.

Using the advantageous approach discussed above the transformation coordinate matrix is generated.

This approach provides significant improvements when texturing when real-world objects that are being used for retrieving textures or patterns are not in optimal conditions. In such cases it is necessary to compare the contours and key points of texture coordinates with key points in images (based upon determined object features) that are in an unpredictable state of curvature. In the case there is a rotation of an object, or the object is distorted due to a large slope, its position can be normalized and brought to an original form using simple mathematical algorithms, but if the object is a picture on a curved sheet, it has a distorted position with respect to the camera (located at an angle), then standard methods are not suitable.

To solve the technical problem of achieving correct distribution of the resulting image relative to UV mapping the newly developed DHOFR-SLAM algorithm can be used. The essence of the approach of the DHOFR-SLAM algorithm is that the object features are detected in the reference image in advance, and then the vertices of the UV grid are attached to the coordinates of the detected features (or their key points), wherein vertices of the UV grid being put in correlation to the features. Subsequently, the image areas specified by the detected features are being distorted relative to the coordinates of the UV vertices, the image then being corrected based upon detected object features in relation to the corresponding UV vertices.

Recognition is performed by comparing the photo image of the object with its reference image, also stored in the memory of the display device, and considering the image recognized when the threshold value of the correlation coefficient of the photo-image and one of the reference images is exceeded or using other known recognition algorithms.

Object shooting can be carried out in at a certain range of angles and distances, so after recognizing the object on the photo image, a correlation matrix of the coordinates of the photo image and the own-coordinates, characterized by the orthogonality of the axes, i.e. the matrix of the coordinate transformation, is formed.

The coordinates of the texturized sections, juxtaposed to the corresponding 3D model polygons and stored in the memory of the device displaying the object.

After recognizing the object, textures of the scanned area of the image are formed based on the values of the coordinate transformation matrix and the data interpolation. Then, the 3D texture pattern is assigned to the acquired image of the scanned area, so that the corresponding ranges are covered by the corresponding texture regions according to the coordinates previously formed at the texturizing stage.

Texturizing of a 3D model assumes assigning a texture to one or more 3D model materials. A material of the 3D model comprising a recognized in accordance with generally accepted conventions aggregation of information related to the way of displaying fragments of the model to which it is assigned, and may include texture, color, etc.

According to the approach described above, the texturizing process includes the process of generating texture coordinates, which in turn includes the following steps:

determining FAST points on the acquired image;
determining a first subset of interest points based upon determined FAST points;

define the most promising areas based upon the determined first subset of interest points;

determine object features on the acquired image by performing n iterations of:

determining $n^{th}$ set of FAST points on the acquired image within the most promising areas;

determining $n^{th}$ set of interest points on the acquired image based on the $n^{th}$ set of FAST points;

forming $n^{th}$ most promising areas for detecting object features of the object on the acquired image; said most promising areas are being reduced by a scaling factor;

determining coordinates of the object features on the acquired image based upon $n^{th}$ most promising areas selected;

arranging the determined object features in a 3D space;

juxtaposing determined coordinates of the object features with coordinates of vertices of a UV grid of the texture areas and its mapping onto the 3D model;

if determined object features and vertices of the texture coordinate mapping do not coincide, adjusting the mapping accordingly to achieve relative displacement of said object features to the vertices of the texture coordinate mapping;

generating the transformation matrix of the coordinates of the texture coordinate mapping with the coordinates of the 3D model;

The process of texturizing the 3D model also involves transferring the color to parts of the 3D model that can not be visible on a 2D graphic image, for example, such "invisible" parts can be the back side of an image element, its side view, top or bottom. The transfer of colors of such "invisible" parts to the polygons of the 3D model is carried out, for example, on the basis of the symmetrical structuring of the 3D model on both sides, or painting the "invisible" areas in a darker tone, or on the basis of other algorithms, including using extrapolation methods.

After the 3D model texturizing, i.e after creating the coordinates of its texture, the 3D model immediately or on the user's command is displayed on the monitor screen of the display device.

The output image comprises a video image where a model, including an animated one, is drawn over the background that is for example a video (video stream) received from the video camera, so that an illusion of its actual presence is created.

Thus, the method of displaying the object allows the user to apply a texture scanned from the real space by means of a photo or video camera to a virtual object.

In the process of visualization, the user is given the opportunity to control the model in space, i.e. rotate, shift, zoom, etc., including by moving the input devices of the display device or by using gestures in the focus of the video camera.

The computational means of the display device are made on the basis of the processor and contain a memory for storing the program of operation of the processor and the necessary data, including reference images and 3D models.

The method of displaying the object, which is a two-dimensional image according to the option 2, comprises sequentially performing the following actions: forming and storing in the memory of the device the reference image of the object with the areas being texturizing and 3D model represented by polygons, wherein coordinates of said polygons correspond to the coordinates of the areas being texturized, receiving, at least one image frame or video image of an object, recognizing of an object on said photo image based upon the reference image, selecting a frame satisfying image quality requirements such as clarity, detail, signal-to-noise ratio, etc., forming a matrix for converting the coordinates of the photo image into its own coordinates, wherein the axes are orthogonal, painting the 3D model elements in the colors of the corresponding photo elements by determining the colors of the color materials of the 3D model based upon the color scanning, at predetermined photographic image points using a coordinate transformation matrix, and then assigning colors to the corresponding 3D model materials. Then implementing a 3D model visualization.

At the same time, at least some portions of the 3D model, for example, portions of the back side of the pattern, are painted in accordance with the predetermined order, and the 3D model is formed with respect to at least a portion of this two-dimensional image, for example, with respect to the most significant of the aggregated plurality of images.

After recognition, the most informative frame from the viewpoint of scanning among the captured frames is selected. Such frames can be frames with the most clear image, with the greatest detail, etc.

Visualization of 3D models is carried out over the video (video stream) using the augmented reality and/or computer vision algorithms.

Painting of the 3D model in accordance with a predetermined order is implemented as generation of texture coordinates in such a way that the areas of the back side of the model have the same coordinates on the texture as the corresponding sections of the front side or the coloring of the sections of the back side of the model are performed on the basis of extrapolation of the data of the visible image parts.

The 3D model implemented as animated.

The method of displaying the object according to the option 2 works as follows.

The objects for displaying are graphic two-dimensional objects—drawings, graphs, schemes, maps, etc. The method assumes the process of recognizing of a graphic object on a photo image by computing means of a display device equipped with a video or camera or other scanning device and a monitor. Such devices can be a mobile phone, a smartphone, a tablet, a personal computer, etc.

A circle of objects in the form of two-dimensional images, i.e. markers, is created beforehand and juxtaposed to corresponding three-dimensional models (3D models) represented by polygons and reference images. Each two-dimensional image is associated with one reference image and one 3D model, stored in the memory of the display device. Reference images are used for recognizing an object and forming a coordinate transformation matrix. 3D models after painting are visualized over a certain background, which can be a video stream formed at the camera's output, or a photo image obtained after photographing an object, or a different background.

Formation of a 3D model involves the process of generating texture coordinates as set forth above.

Recognition is performed by comparing the photo image of the object with its reference image, also stored in the memory of the display device, wherein the photo image shall be considered to be recognized when the threshold value of the photo image correlation coefficient of photo and one of the reference images is exceeded, or other known recognition algorithms are used.

Object shooting can be carried out at a certain range of angles and distances, thus after recognizing the object on the photo image, a matrix of the ratio of the coordinates of the photo image and the own coordinates, characterized by the orthogonality of the axes, i.e. the matrix of the coordinate transformation, is formed.

In the memory of the display device for this object, the coordinates of the texturizing sections are stored, to which the corresponding 3D model ranges are mapped.

After recognizing the object, the textures of the image scanning area are formed based on the values of the coordinate transformation matrix and data interpolation. After that, the color of certain areas is recognized on the photo image and due to a rigid connection between these sections and the 3D model ranges, the structure of the 3D model's surface color becomes appropriate to the color of the sensed object, so the materials directly assigned to the sections of the model without using of textures are directly painted.

3D model texturizing involves assigning a texture to one or more 3D model materials. A material of the 3D model comprising a recognized in accordance with generally accepted conventions aggregation of information related to the way of displaying fragments of the model to which it is assigned, and may include texture, color, etc.

The process of the 3D model texturizing involves transferring the color also to the parts of 3D models that can not be visible on a 2D graphic image, for example, such "invisible" parts can be the back side of an image element, its side view, top or bottom. Transfer of colors of coloring of such "invisible" parts to ranges of the 3D model is carried out, for example, on the basis of symmetrical structuring of the 3D model from both sides, or coloring of "invisible" areas in a darker tone or on the basis of other algorithms, including using extrapolation methods.

After texturizing the 3D model, that is, after creating the coordinates of its texture, the 3D model immediately or on the user's command is displayed on the monitor screen of the display device.

The output image is a video image on which a model, including an animated one, is drawn over the background, for example a video (video stream) received from the video camera, so that an illusion of its actual presence is created.

Thus, the method of displaying an object allows the user to apply a texture sensed from a real space by means of a photo or video camera to a virtual object.

In the process of visualization, the user is given the opportunity to control the model in space, i.e. rotate, shift, zoom, etc., including by moving the input devices of the display device or by using gestures in the focus of the video camera.

The computational means of the display device for implementing the method according to any one of the options 1 or 2 are processor-based and contain a memory for storing the processor operation program and necessary data, including reference images and 3D models.

Figure 4C:
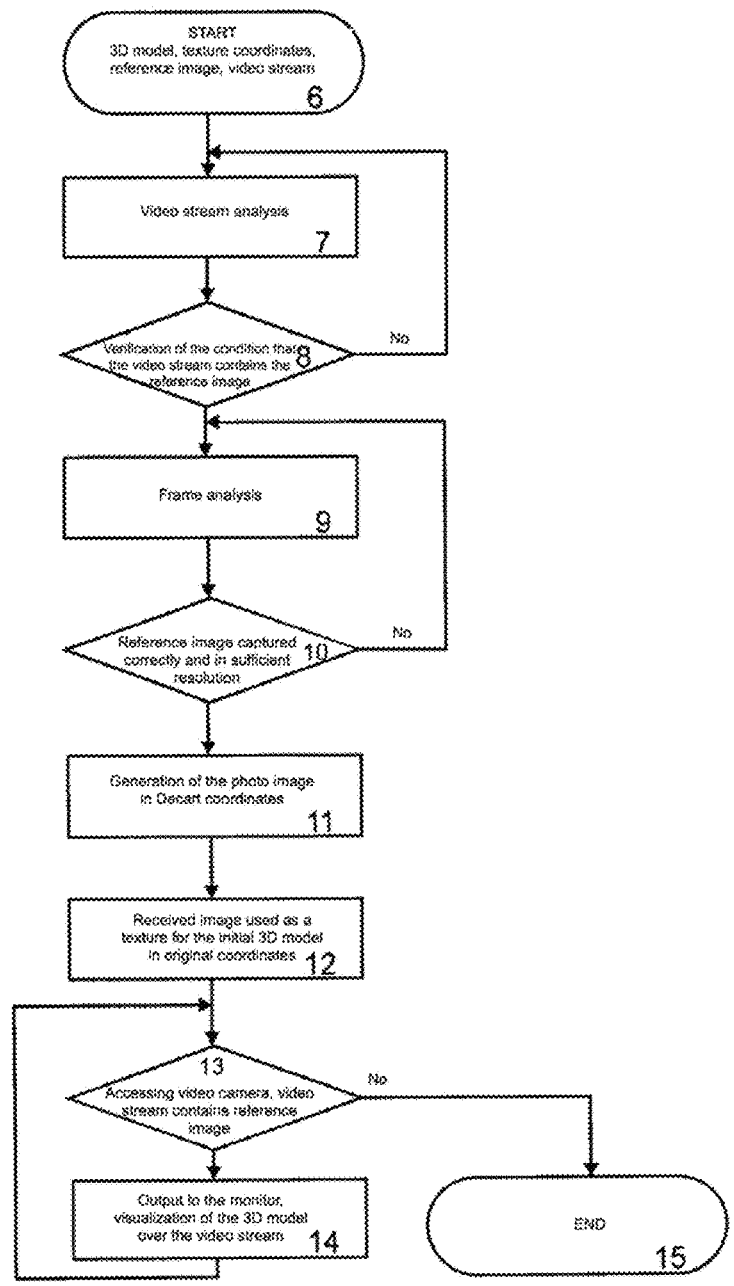
FIG. 4C is a block diagram of the computing aids of a display device.

The block diagram of the processor operation program is shown in FIG. 4 and includes the following main elements. The initial data 6 for the program, stored in the memory comprise the previously formed 3D model, the texture coordinates, the reference image of the object, and the video stream formed at the output of the video camera. The term "video stream" is used here as identical to the term "video series". The program analyzes the video stream in order to select a frame or frames that meet the requirements of the required image clarity, framing, exposure, focus, etc. The frames are sorted and analyzed until a frame meeting the specified requirements is found, and the analysis is done sequentially in two stages. First, 7, 8 from the video sequence, select frames containing the object to be displayed, on which this object is recognized, and then 9, 10 from the selected frame group select frames that meet the requirements for accuracy and framing.

Next, the coordinate transformation matrix 11 is formed and the coordinates of the photo image frame are applied to the Cartesian coordinates of the strictly frontal view of the object. The texture coordinates in the designated texturizing areas are scanned. Materials are assigned 12 to the 3D model texture coordinates. The video stream from the camera's output is analyzed for presence of an object in the frame and if so, the model is visualized over the video stream (video sequence) obtained from the camera output.

As soon as the object ceases to be recognized on video frames, the program is terminated.

Alternatively, instead of terminating the program the following actions can be performed: returning to the beginning of the program, or transferring the device to a brief waiting mode to wait for the fact of recognition, or notifying the user about loss of capture of the object image, or other action.

Example 1

Figure 2:
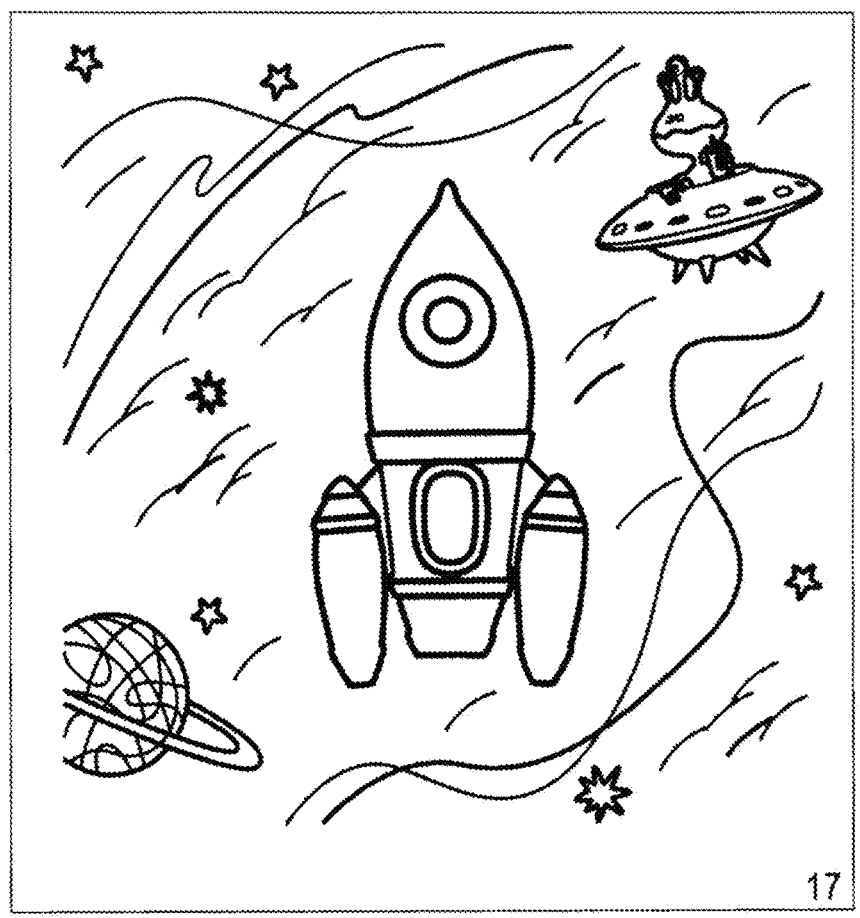
FIG. 2—depicts an image of the original object—a two-dimensional graphic image before its coloring, corresponding to the reference image of the object.

The objects comprise drawings from the developing set of children's contour coloring pictures, which are simple drawings (FIG. 2), comprising contour lines drawn on standard sheets of rectangular shape, having drawing elements for coloring. Each drawing includes one or more main elements located, as a rule, in the central part of the sheet, and minor background elements located on the periphery.

Each of the drawings is associated with the pre-created reference image, the coordinates of the color detection areas of the object and the animated 3D model with the selected ranges corresponds to these areas by polygons. 3D model reflects the volumetric vision of the main elements of the drawing, tied to the coordinates of these elements in the image.

The display device is a smartphone equipped with a video camera, computational means with the corresponding software, monitor, etc.

After the contour drawing is colored by the user, the smartphone is placed such that the whole picture fits in the frame, and take a picture of it, or videotape the picture.

The smartphone recognizes the image directly on the selected frame using computational means, that is it finds a pre-created 3D model corresponding to the image and selects the most informative frame, if several were made, and also forms the matrix of the coordinates of the image elements on the photo image to its own coordinates in the Cartesian system. As a result, the coordinates of the color recognition areas of the painted drawing come matched with the coordinates of the corresponding sections on the photo image.

The color of the painted areas is scanned on the photo image and after the necessary analysis, matching and color correction transfer the coloring of the sections to the corresponding 3D model polygons, that is, the obtained colors being assigned directly to the model materials.

Figure 3:
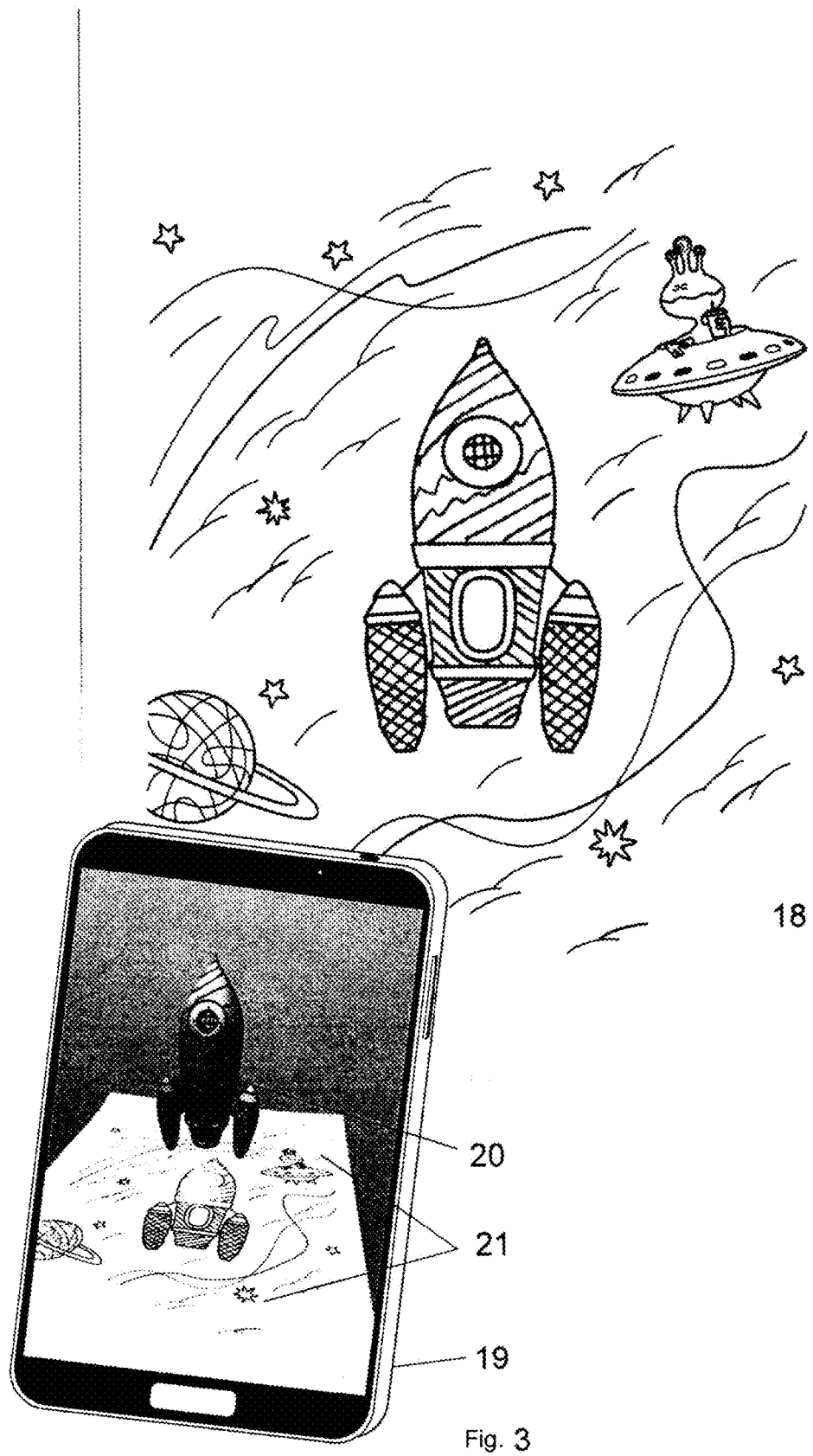
FIG. 3—depicts the painted original graphic image and the 3D model rendered on the screen of the display device, visualized on the screen of the picture.

The next step is visualization of the 3D model (FIG. 3C), displayed over the background, formed by the secondary elements of the picture on the photo image or the video sequence obtained by capturing means of the smartphone. The 3D model can be made movable and have additional elements not shown in the Fig.

The rendered 3D model is interactive, capable of responding to user actions.

Example 2

The display device comprises a personal computer having connected webcam and monitor, and a remote server (FIG.

1). The monitor or display may be any visualization device, including a projector or a hologram forming device. Reference images of the objects and 3D models are stored on a remote service, which is accessed during the displaying of graphic two-dimensional objects.

Calculations in the process of recognition are carried out by means of a personal computer, with the help of which the materials of the 3D model are also colored and rendered.

The computer is connected to the server via the Internet or another network, including a local network.

The mapping process is performed as follows. The user accesses a corresponding website via the Internet, which contains thematic sets of drawings for printing and subsequent coloring. The website is supplied with an appropriate interface for accessing the reference images and storing these images and 3D models corresponding to the patterns from the sets.

The user prints a selected set of drawings on his side with the help of the printer and colors the drawings he likes. The user can also obtain already printed drawings in a different way, for example, via the newsletter. Further, being in the interface of the website, the user directs the webcam in such a way that the main part of the painted picture is included in the frame. The user's computer, executing the appropriate commands of the program accesses the remote server, from which it receives reference images of the drawings for recognition. After recognition of the pattern is completed, a coordinate transformation matrix is generated by means of the personal computer, said program providing for the color of the painted areas of the pattern to be sensed and color of the corresponding 3D model materials to be assigned.

The image of the textured 3D model is output to the monitor over the background of the video sequence obtained from the web camera output.

The method of displaying an object can be implemented using standard devices and components, including computer-based means based on a processor, a photo and/or video camera, a monitor or other visualization device, and also communication means between them.

Thus, the method of displaying the object according to any of the options 1 or 2 provides the ability to display on the output image the real texture of the photo or video image of the object, it provides training capabilities in drawing programs for children, simplifies the implementation by eliminating the need to store a base of any reference objects textures, provides capabilities to texturize areas of the 3D model that are invisible on the 2D object. It also simplifies the use of the texturizing process by providing capability for an untrained user to apply the usual techniques for painting 3D models.

The invention claimed is:

1. A method of displaying a virtual object on a computing device comprising a memory, a camera and a display, said memory adapted to store a plurality of reference images and a plurality of three dimensional (3D) models, wherein each reference image is associated with one 3D model, said method comprising:
acquiring an image from the camera, said acquired image comprising texturized sections,
recognizing a reference image corresponding to the virtual object on the acquired image based upon the reference image,
forming a 3D model associated with the reference image, forming a transformation matrix for mapping coordinates of the acquired image with coordinates of the 3D model; said transformation matrix formed as follows:
determining Features from Accelerated Segment Test (FAST), points on the acquired image;
determining a first subset of interest points based upon determined FAST points;
define a first set of areas based upon the determined first subset of interest points;
determine object features on the acquired image by performing a number of iterations of:
determining a set of FAST points on the acquired image within the most promising first set of areas:
determining a set of interest points on the acquired image based on the set of FAST points;
forming a second set of areas for detecting object features of the object on the acquired image; said second set areas are being reduced by a scaling factor;
determining coordinates of the object features on the acquired image based upon the second set of areas selected;
arranging the determined object features in a 3D space;
juxtaposing determined coordinates of the object features with coordinates of vertices of a texture coordinate mapping grid of the texturized sections of the acquired image and its mapping onto the 3D model;
if determined object features and vertices of the texture coordinate mapping grid do not coincide, adjusting the mapping accordingly to achieve relative displacement of said object features to the vertices of the texture coordinate mapping grid;
generating the transformation matrix of the coordinates of the texture coordinate mapping grid with the coordinates of the 3D model;
using said transformation matrix mapping coordinates of the texturized sections of the acquired image to corresponding sections of the 3D model to determine sections of 3D model corresponding to the texturized sections of the acquired image;
painting the sections of the 3D model using colors and textures of the corresponding texturized sections of the acquired image, and
displaying the 3D model over a video stream using augmented reality tools and/or computer vision algorithms.

2. The method of claim 1, wherein said scaling factor applied at each iteration to the second set areas is $\sqrt{2}$.

3. The method of claim 2, the number of iterations is 35.

4. The method of claim 1, wherein the FAST points and/or interest points are being determined using Shi-Tomasi score.

5. The method of claim 1 wherein the step of determining FAST points comprises using 47 oriented descriptor pairs.

6. The method of claim 1, wherein the 3D model is represented by polygons; and the transformation matrix adapted to map coordinates of the texturized sections of the acquired image with coordinates of the corresponding polygons of the 3D model.

7. The method of claim 1, wherein the virtual object is a graphic image executed on a bent plane.

8. The method of claim 1, further comprising the steps of:
forming parts of the 3D model that are not visible on the acquired image by interpolating data of the transformation matrix;
applying textures to the 3D model by covering corresponding polygons of the 3D model by textures of the corresponding texturized sections according to the determined coordinates, wherein at least some parts of the 3D model that are not visible on the acquired image painted on basis of symmetrical structuring of the 3D model and/or on basis extrapolation of the parts of the acquired image that are visible.

9. A computing device adapted to display a virtual object, said device comprising a memory, a camera and a display, said memory adapted to store at least one reference image and at least one three dimensional (3D), model, wherein each reference image is associated with one 3D model, said device adapted to:
acquire an image from the camera, said acquired image comprising texturized sections,
recognize the virtual object on the acquired image based upon a reference image,
form a 3D model associated with the reference image,
form a transformation matrix for juxtaposing coordinates of the acquired image with coordinates of the 3D model; said transformation matrix formed as follows:
   determining Features From Accelerated Segment Test (FAST), points on the acquired image;
   determining a first subset of interest points based upon determined FAST points;
   define a first set of areas based upon the determined first subset of interest points;
   determine object features on the acquired image by performing a number of iterations of:
      determining a set of FAST points on the acquired image within the first set of areas;
      determining a set of interest points on the acquired image based on the set of FAST points;
      forming a second set of areas for detecting object features of the object on the acquired image; said second set areas are reduced by a scaling factor;
      determining coordinates of the object features on the acquired image based upon the second set of areas selected;
   arranging the determined object features in a 3D space;
   juxtaposing determined coordinates of the object features with coordinates of vertices of a texture coordinate mapping grid of the texturized sections and its mapping onto the 3D model;
   if determined object features and vertices of the texture coordinate mapping grid do not coincide, adjusting the mapping accordingly to achieve relative displacement of said object features to the vertices of the texture coordinate mapping grid;
   generating the transformation matrix of the coordinates of the texture coordinate mapping grid with the coordinates of the 3D model;
juxtapose coordinates of the texturized sections of the acquired image to corresponding sections of the 3D model;
paint the sections of the 3D model using colors and textures of the corresponding texturized sections of the acquired image, and
display the 3D model over a video stream using augmented reality tools and/or computer vision algorithms;
form parts of the 3D model that are not visible on the acquired image by interpolating data of the transformation matrix.

10. The device of claim 9 wherein said scaling factor applied at each iteration to the second set areas is $\sqrt{2}$.

11. The device of claim 9 wherein the number of iterations is 35.

12. The device of claim 9 wherein the FAST points and/or interest points are being determined using Shi-Tomasi score.

13. The device of claim 9 wherein determining FAST points comprises using 47 oriented descriptor pairs.

14. The device of claim 9 wherein the 3D model is represented by polygons; and wherein the transformation matrix adapted to map coordinates of the texturized of the acquired image with coordinates of the corresponding polygons of the 3D model.

15. The device of claim 9, wherein the virtual object is a graphic image executed on a bent plane.

16. The device of claim 9, further adapted to apply textures to the 3D model by covering corresponding polygons of the 3D model by the textures of the corresponding texturized sections according to the determined coordinates, wherein at least some parts of the 3D model that are not visible on the acquired image painted on basis of symmetrical structuring of the 3D model and/or on basis extrapolation of the parts of the acquired image that are visible.

* * * * *